US008865102B2

(12) United States Patent
Endo et al.

(10) Patent No.: US 8,865,102 B2
(45) Date of Patent: Oct. 21, 2014

(54) CARBON MATERIAL AND METHOD FOR PRODUCING SAME

(75) Inventors: Morinobu Endo, Suzaka (JP); Yong Jung Kim, Nagano (JP); Akira Tsujiko, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 183 days.

(21) Appl. No.: 13/265,401

(22) PCT Filed: Apr. 22, 2010

(86) PCT No.: PCT/JP2010/057180
§ 371 (c)(1),
(2), (4) Date: Oct. 20, 2011

(87) PCT Pub. No.: WO2010/123081
PCT Pub. Date: Oct. 28, 2010

(65) Prior Publication Data
US 2012/0034463 A1 Feb. 9, 2012

(30) Foreign Application Priority Data
Apr. 24, 2009 (JP) .................................. 2009-105921

(51) Int. Cl.
*C01B 31/00* (2006.01)
(52) U.S. Cl.
USPC ................... 423/445 B; 423/460; 423/445 R; 977/743
(58) Field of Classification Search
USPC ....... 423/447.1, 460, 445 R, 445 B; 977/742, 977/743
See application file for complete search history.

(56) References Cited

U.S. PATENT DOCUMENTS

| 5,612,155 A | 3/1997 | Takami et al. |
| 6,156,457 A | 12/2000 | Takami et al. |

FOREIGN PATENT DOCUMENTS

| EP | 1 462 415 | 9/2004 |
| EP | 1 462 415 A2 | 9/2004 |

(Continued)

OTHER PUBLICATIONS

Qian-ming Gong, Zhi Li, Xiao-dong Bai, Dan Li, Yun Zhao, Ji Liang, Thermal properties of aligned carbon nanotube/carbon nanocomposites, Materials Science and Engineering: A, vol. 384, Issues 1-2, Oct. 25, 2004, pp. 209-214, ISSN 0921-5093, 10.1016/j.msea.2004.06.006. http ://www.sciencedirect.com/science/article/pii/S0921509304008010X).*

(Continued)

*Primary Examiner* — Richard M Rump
(74) *Attorney, Agent, or Firm* — Finnegan, Henderson, Farabow, Garrett & Dunner, LLP

(57) ABSTRACT

A method of producing a carbon material which is mainly composed of graphene-containing carbon particles is provided. The method includes a step of producing carbon particles from an organic material by maintaining a mixture containing the organic substance as a starting material, hydrogen peroxide and water under conditions of a temperature of 300° C. to 1000° C. and a pressure of 22 MPa or more. The method further includes a step of heat-treating the carbon particles at a higher temperature than the temperature maintained in the carbon particle producing step. The carbon material produced by the present method has a structure in which substances such as ions can easily enter and leave the graphene structures of the carbon particles, making the carbon material be useful as active materials of secondary batteries and electric double layer capacitors.

9 Claims, 17 Drawing Sheets

(56) References Cited

FOREIGN PATENT DOCUMENTS

| | | |
|---|---|---|
| JP | 8-7885 | 1/1996 |
| JP | 10-312807 | 11/1998 |
| JP | 2004-178819 | 6/2004 |
| JP | 2004-292231 | 10/2004 |
| JP | 2004-323345 | 11/2004 |
| JP | 2005-324995 | 11/2005 |
| JP | 2006-240937 | 9/2006 |
| JP | 2006-282484 | 10/2006 |
| JP | 2007-320841 | 12/2007 |
| KR | 10-2004-0085037 | 10/2004 |
| WO | WO 2004/089821 A1 | 10/2004 |

OTHER PUBLICATIONS

Ni, Zhen Hua, et al. "Tunable stress and controlled thickness modification in graphene by annealing." ACS nano 2.5 (2008): 1033-1039.*

Ki Chul Park et al., "Production of Carbon Soot in Subcritical and Supercritical Water," 6th Conference on Supercritical Fluids and Their Applications, Sep. 9-12, 2001.

International Search Report in International Application No. PCT/JP2010/057180; Mailing Date: Jul. 20, 2010.

Park, K.C., "Carbon formation promoted by hydrogen peroxide in supercritical water," Carbon 46 (2008), pp. 1804-1808.

* cited by examiner

1μm

500nm

5nm

10nm

1μm

500nm

20nm

1μm

200nm

CARBON MATERIAL AND METHOD FOR PRODUCING SAME

TECHNICAL FIELD

The present invention relates to graphene-containing carbon particles and a carbon material which is mainly composed of the carbon particles.

The present application is a national phase application of International Application No. PCT/JP2010/057180, filed Apr. 22, 2010, and claims the priority of Japanese Patent Application No. 2009-105921 filed on Apr. 24, 2009, the contents of both of which are incorporated herein by reference in their entirety.

BACKGROUND ART

Carbon particles containing graphene crystals are used as materials to constitute secondary batteries, electric double layer capacitors and the like. Graphite particles may typically be graphene-containing carbon particles. The technical references relating to graphene-containing carbon particles may include Patent documents 1 and 2 and Non-patent document 1.

Patent document 1: Japanese Patent Application Laid-open No. 2004-178819

Patent document 2: Japanese Patent Application Laid-open No. 2007-320841

Non-patent document 1: Ki, Chul Park, Seong-Yun Kim, Hitoshi Yamazaki, Hiroshi Tomiyasu, Production of carbon soot in subcritical and supercritical water, 6th Conference on supercritical fluids and their applications, Sep. 9-12, 2001

DISCLOSURE OF THE INVENTION

Patent document 1 suggests using spheroidal graphite in which graphite crystals are radially arranged for negative electrodes of non-aqueous electrolyte secondary batteries. However, this method requires baking spheroidal carbon at high temperatures (typically at 2800° C. to 3000° C.) to graphitize the same, increasing energy cost. In addition, it is difficult to produce carbon particles having small particle diameters (e.g. particle diameter of less than 1 μm, i.e. of the order of submicrons) according to the method described in Patent document 1.

Non-patent document 1 describes the technology for producing graphene-containing carbon particles by reacting a carbon source with hydrogen peroxide in water in a supercritical or subcritical state. It is an object of the present invention, by further expanding this method, to provide a method which allows effective production of graphene-containing carbon particles having a desired structure and a carbon material mainly composed of the carbon particles. It is another object of the present invention to provide carbon particles having small particle diameters and having a structure in which a large part of graphene contained therein is angularly arranged with respect to the particle surface, and a carbon material mainly composed of the carbon particles. It is still another object of the present invention to provide a non-aqueous electrolyte secondary battery and capacitor by utilizing the carbon materials.

According to the present invention, a method of producing a carbon material mainly composed of (i.e. 50% by mass or more of which is accounted for by) graphene-containing carbon particles is provided. The method includes a step of producing carbon particles by maintaining a mixture containing an organic substance as a starting material, hydrogen peroxide and water under the conditions of a temperature of 300° C. to 1000° C. and a pressure of 22 MPa or more (carbon particle producing step). The method may further include the step of heat-treating the carbon particles (heat treatment step). By producing the carbon particles by reacting the organic substance with hydrogen peroxide ($H_2O_2$) under the conditions of high temperature and high pressure (typically in supercritical or subcritical water) and then heat-treating the carbon particles, the carbon material can be effectively produced which is mainly composed of the graphene-containing carbon particles having a desired structure. The heat treatment is typically carried out at a temperature higher than the temperature maintained in the carbon particle producing step.

In the following descriptions, the carbon particles which have been obtained in the carbon particle producing step but have not been heat-treated may be referred to as "crude carbon particles", in order to distinguish from the carbon particles after the heat treatment. The carbon particles obtained by heat-treating the crude carbon particles may be referred to as "heat-treated carbon particles" in order to distinguish from the carbon particles which have not been heat-treated.

The carbon material produced according to the present method may substantially be composed of the carbon particles obtained after the heat treatment. Thus, in another aspect, the present invention provides a method of producing graphene-containing carbon particles. The method includes the step of producing carbon particles (crude carbon particles) by maintaining a mixture containing an organic substance as a starting material, hydrogen peroxide and water under the conditions of a temperature of 300° C. to 1000° C. and a pressure of 22 MPa or more. The method may further include the step of heat-treating the carbon particles to obtain heat-treated carbon particles. The heat treatment is typically carried out at a temperature higher than the temperature maintained in the carbon particle producing step.

In any of the methods disclosed herein, the organic substance which may be preferably used as the starting material includes hydrocarbons. The temperature of the heat treatment can be, for example, 600° C. to 2000° C.

In a preferred mode of the methods disclosed herein, the carbon particles (crude carbon particles) produced in the carbon particle producing step have a ratio ($I_D/I_G$) of the D peak intensity ($I_D$) and the G peak intensity ($I_G$) in Raman spectra of approximately 0.6 or more. This peak intensity ratio $I_D/I_G$ is a parameter indicating a degree of crystallinity of carbon particles. It is believed that the bigger the value of $I_D/I_G$ is, the smaller a degree of growth (degree of development) of graphene tends to be and thus the smaller the size of a graphene crystal is. The crude carbon particles are preferably heat-treated in which their graphene growth is suppressed such that they have the $I_D/I_G$ value of approximately 0.65 or more, e.g. approximately 0.7 or more. Accordingly, the carbon material is effectively produced which is mainly composed of the carbon particles (heat-treated carbon particles) having a structure in which a large part of graphene contained therein is angularly arranged with respect to the surface of the particles. Such carbon particles have a structure such that substances such as ions can easily enter and leave the graphene structures of the particles. This makes the carbon material which is mainly composed of such carbon particles (which may substantially be composed of the carbon particles) useful as, for example, active materials of secondary batteries, active materials of electric double layer capacitors and the like.

The $I_D/I_G$ value of the carbon particles obtained in the carbon particle producing step can be adjusted by appropriately selecting, for example, process conditions (temperature, pressure etc.) in this step. For example, the carbon particles having the $I_D/I_G$ value of 0.6 or more, preferably 0.65 or more can be effectively produced by maintaining the mixture under the conditions of a temperature of 300° C. to 600° C. and a pressure of 22 MPa to 100 MPa in the carbon particle producing step.

According to the present invention, a carbon material which is mainly composed of the graphene-containing carbon particles is also provided. The carbon particles composing the carbon material have a mean particle diameter of approximately 1 μm or less, typically less than 1 μm, preferably 0.7 μm or less. Approximately 80% or more of the graphene constituting the area within 10 nm from the surface (which may be the interface with other particles) of the carbon particles are arranged at an angle of 90°±75°, preferably of 90°±45° with respect to the surface of the particles, as examined under a transmission electron microscope (TEM).

Such carbon particles have a structure such that substances such as ions can easily enter and leave the graphene structures of the particles. This makes the carbon material which is mainly composed of such carbon particles (which may substantially be composed of the carbon particles) useful as, for example, active materials of secondary batteries (e.g. lithium-ion batteries and other non-aqueous electrolyte secondary batteries), active materials of electric double layer capacitors and the like.

According to the present invention, a secondary battery which includes any of carbon materials disclosed herein (hereinafter, these may be carbon materials produced by any of methods disclosed herein) is also provided. According to the present invention, an electric double layer capacitor which includes any of carbon materials disclosed herein is also provided.

DESCRIPTION OF EMBODIMENTS

Figure 1A:
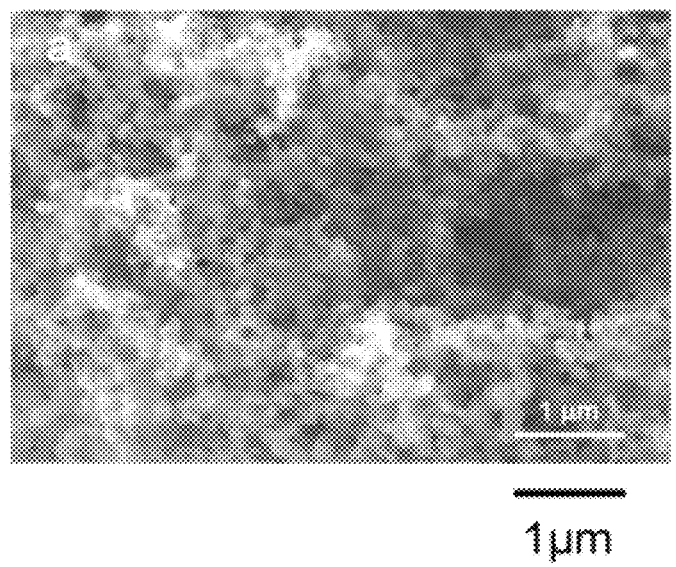
FIG. 1A is the low-power SEM image of carbon particles A1 obtained in Example 1.
Figure 1B:
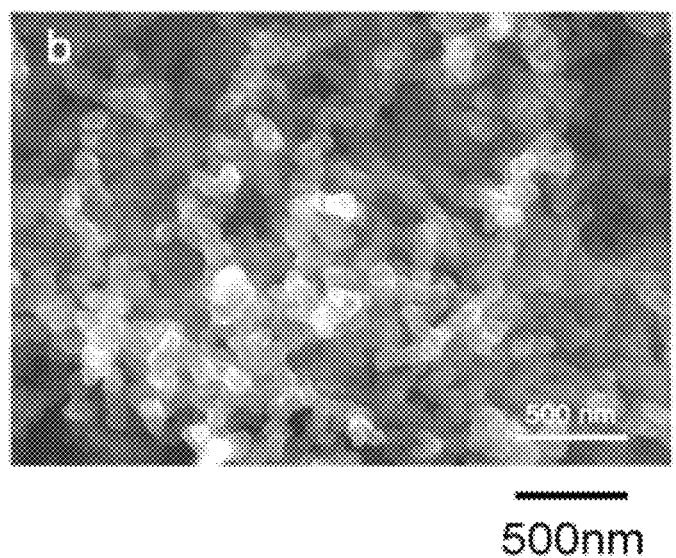
FIG. 1B is the high-power SEM image of carbon particles A1 obtained in Example 1.
Figure 1C:
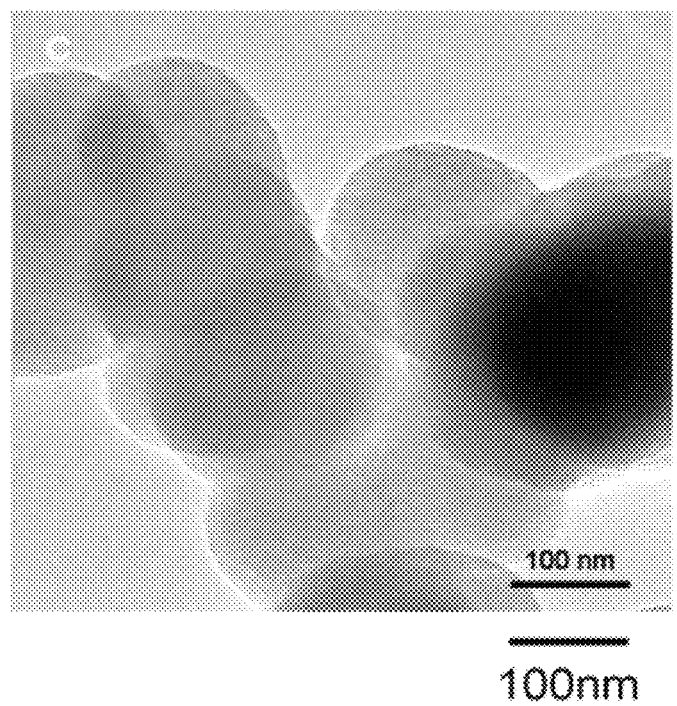
FIG. 1C is the low-power TEM image of carbon particles A1 obtained in Example 1.

Preferred aspects of the present invention are now illustrated hereinafter. Matters other than those specifically referred to in the present specification, which are necessary for the implementation of the present invention, may be recognized as a matter of choice by one of ordinary skill based on the conventional art to which the present invention belongs. The present invention can be implemented based on the matters disclosed herein and the common knowledge in the art.

According to the technique disclosed herein, a starting material used for the synthesis of carbon particles is a carbon-containing compound, i.e. an organic substance. Preferred organic substance to be used includes hydrocarbons. Any hydrocarbons such as aliphatic hydrocarbons which may or may not contain an unsaturated group (e.g. n-hexane), alicyclic hydrocarbons which may or may not contain an unsaturated group, aromatic hydrocarbons which may or may not contain a substituent (e.g. monocyclic aromatic hydrocarbons such as benzene, condensed ring-containing aromatic hydrocarbons such as naphthalene and anthracene) can be used. The organic substance to be used may be the one composed of substantially one compound or the one comprises two or more compounds (e.g. gas oil).

In the carbon particle producing step, such an organic substance is maintained under the conditions of a temperature of 300° C. to 1000° C. and a pressure of 22 MPa or more, e.g. 22 MPa to 100 MPa with hydrogen peroxide and water. The above process conditions (temperature and pressure) correspond to a supercritical or subcritical state of water (the critical point of water is 374° C. and 22.1 MPa). According to such treatment of reacting the organic substance with hydrogen peroxide in supercritical or subcritical water (in other words, in a supercritical or subcritical water reaction field), the organic substance can be converted to the carbon particles. By producing the carbon particles in supercritical or subcritical water, the particles produced are less likely to aggregate excessively even if the particles have a small particle diameter (e.g. a particle diameter of 1 μm or less). Therefore, one mode of the carbon particle producing step in which the crude carbon particles having a mean particle diameter of 0.02 μm to 1 μm, preferably 0.02 μm to 0.7 μm can be preferably carried out.

The amount of hydrogen peroxide ($H_2O_2$) used in the carbon particle producing step is preferably a half (½) or less, typically ½ to ⅟₅₀, for example ⅕ to ⅟₂₀, of moles of hydrogen oxide ($M_P$) which is required for complete oxidative decomposition of the organic substance (e.g. when the starting material is a hydrocarbon, moles of hydrogen oxide which is required for oxidative decomposition of the hydrocarbon to carbon dioxide and water), depending on the amount of the starting material, organic substance. Such limitation of the amount of hydrogen peroxide used makes it possible to partially, rather than completely, oxidise the organic substance to effectively produce a radical species contributing to the formation of the carbon particles (e.g. a radical species which forms graphene by a polymerization reaction).

The carbon particles obtained in the carbon particle producing step (crude carbon particles) typically contain graphene. The inclusion of graphene in the carbon particles can be confirmed from the Raman spectra of the carbon particles in a common Raman spectrometer with the D peak at around 1340 cm$^{-1}$ (D band) and the G peak at around 1600 cm$^{-1}$ (G band). The crystal size (degree of growth) of graphene contained in the carbon particles can be confirmed by a ratio ($I_D/I_G$) of the D peak intensity ($I_D$) and the G peak intensity ($I_G$) in the Raman spectra. The $I_D/I_G$ value of the crude carbon particles can be, for example, approximately 0.95 or less. It is usually preferable to carry out the carbon particle producing step so that the crude carbon particles having the $I_D/I_G$ value of 0.9 or less are produced.

According to the technique disclosed herein, the crude carbon particles are heat-treated to give heat-treated carbon particles. The heat treatment can be carried out in the process conditions (temperature, duration etc.) which increase or decrease 0.1 or more and typically 0.2 or more of the $I_D/I_G$ value. In a preferred mode, the heat treatment is carried out so that the $I_D/I_G$ value decreases (in other words, so that the crystallization of graphene proceeds) after the treatment. For example, the heat treatment can be carried out so that 0.1 or more, preferably 0.2 or more of the $I_D/I_G$ value decreases after the treatment. An upper limit of the range of decrease of the $I_D/I_G$ value by the heat treatment is not specifically limited. It is usually appropriate to carry out the heat treatment so that the $I_D/I_G$ value of the heat-treated carbon particles is 0.1 or more, typically 0.2 or more.

According to the technique disclosed herein, the orientation of graphene can be altered by heat-treating the crude carbon particles. The heat treatment for such alteration of the orientation is appropriately carried out in the process conditions (temperature, duration etc.) so that the $I_D/I_G$ value of the heat-treated carbon particles is 0.1 or more, preferably 0.2 or more higher than that of the crude carbon particles. For example, the temperature is preferably lower than 1500° C., typically 800° C. or higher and lower than 1500° C., preferably 900° C. or higher and 1300° C. or lower, e.g. 1000° C.±50° C., and the duration is preferably 5 minutes or longer, preferably 10 minutes or longer, e.g. about 30 minutes. An upper limit of the duration is not specifically limited; however, it is appropriately within 24 hours in view of productivity and the like. The carbon particles obtained by the heat treatment for the alteration of the orientation may further be subjected to a heat treatment under the process conditions (temperature, duration etc.) so that the $I_D/I_G$ value of the carbon particles can be decreased. Accordingly, the degree of growth of graphene can be increased in the carbon particles in which the orientation has been altered. In this case, the heat treatment for increasing the degree of growth of graphene is preferably carried out at a higher temperature range than the heat treatment for the alteration of the orientation.

The temperature of the heat treatment can appropriately be selected, for example, from a range of approximately 600° C. to 3000° C. In a preferred mode, the temperature of the heat treatment is selected from a range of approximately 600° C. to 2000° C., preferably of 800° C. to 2000° C. When the temperature of the heat treatment is too low, effects of the process (e.g. at least one effect among reduction in $I_D/I_G$ value, advance in crystallization of graphene, alteration or adjustment of the orientation of graphene and the like) may be insufficient, or productivity may decrease due to the prolonged process duration in order to obtain such effect(s). On the other hand, when the temperature of the heat treatment is too high, inconveniences tends to happen such as aggregation of the carbon particles which are to be treated. In view of energy cost, it is also preferable to avoid the heat treatment at an extremely high temperature. The technique disclosed herein can preferably carried out in a mode in which the heat treatment is carried out at lower than approximately 1500° C., typically approximately 800° C. or higher and lower than 1500° C., for example about 1000° C. For example, the heat treatment for the alteration of the orientation can be carried out by employing such a temperature. The technique disclosed herein can preferably carried out in a mode in which the heat treatment is carried out at approximately 1500° C. or higher, typically approximately 1500° C. or higher and 2000° C. or lower, preferably 1500° C. or higher and 1900° C. or lower. For example, the heat treatment in order to increase the degree of growth of graphene can be carried out by employing such a temperature.

According to the technique disclosed herein, the temperature of the heat treatment employed can yet be 2000° C. or lower, more preferably 1500° C. or lower, as described above. This is attributable to the fact that the orientation of graphene of the crude carbon particles (typically, the carbon particles produced in a supercritical water reaction field) can be altered or adjusted by the heat treatment. This is advantageous for preventing or suppressing an event in which the carbon particles are significantly aggregated by the heat treatment or some carbon particles grow unintentionally by accepting carbon from other particles. Accordingly, the technique disclosed herein can preferably be applied to production, for example, of the carbon material which is mainly composed of the carbon particles having a mean particle diameter of approximately 1 μm or less, typically approximately 0.02 μm to 1 μm, more preferably approximately 0.02 μm to 0.7 μm.

The heat treatment can be carried out in an inert or reducing atmosphere. For example, one mode of the heat treatment is preferably employed which is carried out in an inert gas atmosphere such as argon (Ar) gas, nitrogen ($N_2$) gas, mixed gas thereof etc. Surrounding pressure of the heat treatment may be ordinary pressure (atmospheric pressure) or increased or decreased pressure. Usually, the heat treatment is preferably carried out at ordinary pressure in view of operability and facility cost.

Figure 8:
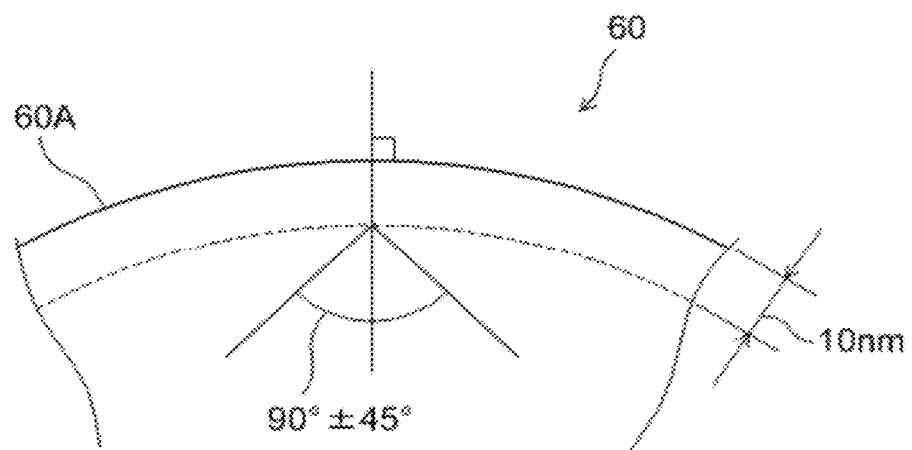
FIG. 8 is a schematic section view which illustrates the arrangement of graphene.
Figure 9:
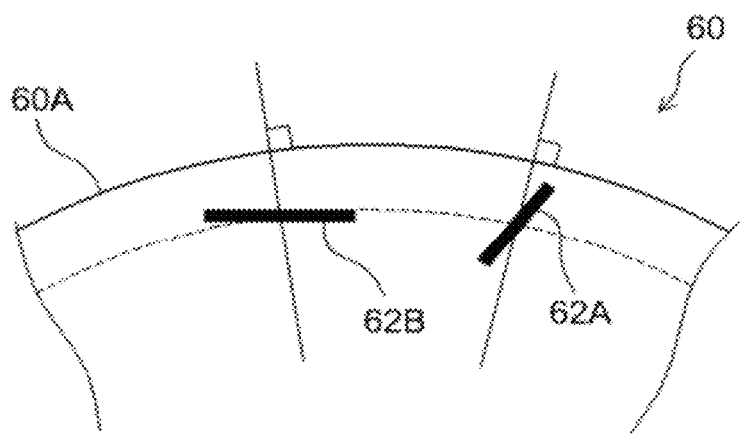
FIG. 9 is a schematic section view which illustrates the arrangement of graphene.

According to the technique disclosed herein, carbon particles in which graphene is radially oriented, a carbon material which is mainly composed of the particles and methods of producing thereof may be provided. As used herein, "graphene is radially oriented" means that, as illustrated in FIGS. 8 and 9, when the carbon particle 60 is examined under a TEM, a half or more, e.g. 80% or more of graphene constituting the area (shown with a dotted line) within 10 nm from the surface 60A of the particle are arranged such that the angle between the surface 60A of the particle and the crystal plane of graphene is 90°±45°. Hereinafter, the carbon particles in which graphene is mainly radially oriented is sometimes referred to as "radially-oriented carbon particles". Hereinafter, the carbon particles in which a half or more, e.g. 80% or more of graphene constituting the area within 10 nm from the surface of the particles are arranged at an angle of less than ±15° with respect to the surface of the particles are sometimes referred to as "concentrically-oriented carbon particles". The carbon particles in which a half or more, e.g. 80% or more of graphene constituting the area within 10 nm from the surface of the particles are arranged at an angle of 90°±75° with respect to the surface of the particles are sometimes referred to as "angularly-oriented carbon particles". The radially-oriented carbon particles correspond to the carbon particles in which graphene forms bigger angle with respect to the surface of the particles among the angularly-oriented carbon particles. In FIG. 9, graphene 62A is exemplary graphene which is arranged at an angle of 90°±45° with respect to the surface 60A of the particle and graphene 62B is exemplary graphene which is arranged at an angle of less than ±15° with respect to the surface 60A of the particle.

The above radially-oriented carbon particles are preferably prepared by producing carbon particles having the $I_D/I_G$ value of 0.65 or more, preferably 0.7 or more, typically 0.95 or less in the carbon particle producing step and heat-treating the carbon particles (crude carbon particles) as described above. In case of preparing the above radially-oriented carbon particles or a carbon material which is mainly composed of the particles, the process conditions (temperature, pressure etc) in the carbon particle producing step are preferably selected so that the crude carbon particles having the above $I_D/I_G$ value are effectively obtained.

According to the findings by the present inventors, the lower the temperature in the carbon particle producing step is, the higher the $I_D/I_G$ value of the produced carbon particles tends to be. In addition, the lower the pressure in the carbon particle producing step is, the higher the $I_D/I_G$ value of the produced carbon particles tends to be. Although it may vary depending on the type of the organic substance (starting material) to be used, generally, the carbon particles having the $I_D/I_G$ value of 0.6 or more can be effectively produced in the process conditions of a temperature of 300° C. to 600° C. and a pressure of 22 MPa to 100 MPa in the carbon particle producing step. When, for example, a hydrocarbon having about 6 to 20 carbon atoms is used as the starting material for production of the carbon particles, the above process conditions can preferably be applied as the process conditions in the carbon particle producing step. In a preferred mode, the carbon particle producing step is carried out, among the above process conditions, in a range where water is in a supercritical state (i.e. 374° C. to 600° C. and 22.1 MPa to 100 MPa). According to such process conditions, the carbon particles can be produced more effectively. For example, such conditions allow at least one of improvements in yield and reaction time. This is preferable in view of productivity. The above temperature may be 500° C. or lower, e.g. 300° C. to 500° C., preferably 374° C. to 500° C. According to such process conditions, the carbon particles having the $I_D/I_G$ value of 0.6 or more, or 0.7 or more can be effectively (e.g. in high yield) produced.

In a preferred mode of the technique disclosed herein, the crude carbon particles having the $I_D/I_G$ value of 0.65 or more, more preferably 0.7 or more are heat-treated. This allows the carbon material to be obtained which is mainly composed of the carbon particles in which graphite is radially oriented (the carbon material may be substantially composed of the carbon particles). For example, the carbon particles can be produced in which approximately 70% or more, more preferably approximately 80% or more, for example approximately 90% or more of graphene constituting the area within 10 nm from the surface of the particles are arranged at an angle of 90°±75° with respect to the surface of the particles.

The orientation of graphite in the carbon particles prior to the heat treatment (crude carbon particles) may be angular (e.g. radial) or concentric or mixture thereof. Alternatively, the carbon particles may not have obvious orientation under TEM examination. The technique disclosed herein can preferably carried out in a mode in which, for example, the crude carbon particles are heat-treated, which have the $I_D/I_G$ value of 0.65 or more, more preferably 0.7 or more and have a structure in which at least part of graphite is arranged concentrically as examined under a TEM (it is sufficient that a concentrical structure is generally observed; for example, the proportion of graphene arranged concentrically may be less than a half of graphene constituting the area within 10 nm from the surface of the particles). According to such heat treatment, crystallization of graphene can proceed (e.g. $I_D/I_G$ value is decreased by 0.1 or more), as well as the orientation of graphene can be changed from concentrical to radial to obtain the radially-oriented carbon particles.

In the radially-oriented carbon particles obtained by the technique disclosed herein, a large part of graphene in the vicinity of the surface of the particles is arranged to form an angle of 45° or more with respect to the surface of the particles (typically, graphene is arranged radially from the centre towards the surface of the particles). Accordingly, more edges of graphene are exposed at the surface of the particles in the radially-oriented carbon particles compared to the carbon particles in which graphene is mainly arranged concentrically. Such structure of the radially-oriented carbon particles allows substances to easily enter and leave the graphene structures of the particles. For example, lithium ions can easily enter and leave the graphene structures. Thus, the above radially-oriented carbon particles or the carbon material which is mainly composed of the carbon particles are/is useful as, for example, active materials (typically negative electrode active materials) for constituting lithium-ion batteries having preferable output characteristics. The above radially-oriented carbon particles also have a property such that ions easily adsorb/desorb to/from graphene. Thus, the radially-oriented carbon particles or the carbon material which is mainly composed of the particles are/is useful as, for example, active materials for constituting electric double layer capacitors having preferable capacitance characteristics.

According to the technique disclosed herein, the carbon particles in which a half or more, e.g. 80% or more of graphene constituting the area within 10 nm from the surface of the particles are arranged at an angle of less than ±15° with respect to the surface of the particles (i.e. concentrically-oriented carbon particles), a carbon material which is mainly composed of the carbon particles and methods of producing thereof are provided. In a preferred mode, a mean particle diameter of the carbon particles is 1 μm or less, typically 0.02 μm to 0.7 μm. In a preferred mode of the concentrically-oriented carbon particles disclosed herein, the $I_D/I_G$ value of the particles is less than 0.65, more preferably 0.55 or less. The concentrically-oriented carbon particles having such $I_D/I_G$ value can be prepared, for example, by producing carbon particles by maintaining a mixture containing an organic substance as a starting material, hydrogen peroxide and water under the conditions of a temperature of 600° C. to 1000° C. and a pressure of 22 MPa or more, typically 22.1 MPa to 100 MPa and heat-treating the produced carbon particles. When the temperature and pressure in the carbon particle producing step are increased, a mean particle diameter of the produced carbon particles tends to be reduced.

According to the findings by the present inventors, the higher the temperature in the carbon particle producing step is, the lower the $I_D/I_G$ value of the produced carbon particles tends to be. In addition, the higher the pressure in the carbon particle producing step is, the lower the $I_D/I_G$ value of the produced carbon particles tends to be. Thus, by selecting the temperature and pressure in the carbon particle producing step at relatively high ranges as described above, the carbon particles having a low $I_D/I_G$ value (preferably less than 0.65) can be produced. The carbon particles (crude carbon particles) may have the structure in which at least part of graphite is arranged concentrically as examined under a TEM. At this stage of the crude carbon particles, it is sufficient that a concentrically arranged structure is generally observed. For example, the proportion of graphene arranged concentrically may be less than a half of graphene composing the area within 10 nm from the surface of the particles. Naturally, the proportion of graphene arranged at an angle of less than ±15° with respect to the surface of the crude carbon particles may be a half or more of graphene composing the area within 10 nm from the surface of the particles.

Such carbon particle (crude carbon particles) can be heat-treated to proceed crystallization of graphene while maintaining or developing the concentrically arranged structure, so that the carbon particles having a further decreased $I_D/I_G$ value (e.g. 0.5 or less) are produced. The obtained carbon particles may be concentrically-oriented carbon particles in which approximately 70% or more, more preferably approximately 80% or more, for example approximately 90% or more of graphene constituting the area within 10 nm from the surface of the carbon particles (heat-treated particles) are arranged at an angle of less than ±15° with respect to the surface of the particles.

In the concentrically-oriented carbon particles, a large proportion of graphene stretches approximately along the surface of the particles. Thus, the particles having a low $I_D/I_G$ value (i.e. having a high degree of crystallinity of graphene) may have a structure in which edges of graphene are relatively less exposed at the surface of the particles. The carbon particles having such structure tend to show higher chemical stability compared to the carbon particles in which more edges are exposed. Thus, the above concentrically-oriented carbon particles preferably have a property such that they decompose less non-aqueous electrolytes (typically liquid electrolytes), i.e. have low ability to decompose electrolytes, when they are used as, for example, negative electrode active materials of lithium-ion batteries or active materials of electric double layer capacitors.

According to the technique disclosed herein, the carbon particles which have an arrangement of graphite in between that of the above radially-oriented carbon particles and the above concentrically-oriented carbon particles, a carbon material which is mainly composed of the carbon particles and methods of producing thereof are provided. Such carbon particles may include, for example, carbon particles in which a half or more, e.g. 80% or more of graphene constituting the area within 10 nm from the surface of the particles are angularly arranged at an angle of 15° or more and less than 45° or more than 135° and 165° or less (corresponding to angularly-oriented carbon particles), carbon particles in which graphene constituting the area within 10 nm from the surface of the particles does not show clear orientation, and the like. The carbon particles having such structures can be produced, for example, during the conversion from the above concentrical orientation to the radial orientation by heat-treating the crude carbon particles which have the $I_D/I_G$ value of 0.65 or more, more preferably 0.7 or more and in which graphite is concentrically oriented. Accordingly, the carbon particles having such medial graphite arrangement can be obtained by adjusting the conditions (temperature, duration etc.) of the heat treatment applied to the crude carbon particles. Such carbon particles are able to show low ability to decompose electrolytes and high output characteristics in a balanced manner when, for example, they are used as negative electrode active materials of lithium-ion batteries. When they are used as active materials of electric double layer capacitors, they are able to show low ability to decompose electrolytes and high capacitance characteristics in a balanced manner.

The following descriptions illustrate structural examples of lithium-ion batteries in which the carbon materials disclosed herein are used as negative electrode active materials and of electric double layer capacitors in which the carbon materials are used as active materials, and do not intend to limit the usage mode of the carbon materials.

The lithium-ion batteries disclosed herein are in a form such that a positive electrode and a negative electrode which respectively contain electrode active materials capable of reversibly occluding and releasing lithium are contained in a container together with a non-aqueous electrolyte. The negative electrode comprises any of carbon materials disclosed herein as an active material (negative electrode active material). For example, the negative electrode preferably employed can be in a form which is obtained by moulding into a desired shape (e.g. pellets) or attaching to a conductive member (current collector) the carbon material together with a binder and an optional conductive material. The above binder includes, for example, polyvinylidene fluoride (PVDF), polytetrafluoroethylene (PTFE), carboxymethyl cellulose (CMC), styrene-butadiene rubber (SBR) and the like. The negative electrode active material used may include, together with any of carbon materials disclosed herein, a material which has been known to be used as a negative electrode active material of common lithium-ion batteries.

The positive electrode employed may preferably be in a form which is obtained by moulding into a desired shape or attaching to a conductive member (current collector) an appropriate positive electrode active material together with a binder and an optional conductive material. The positive electrode active material to be used may preferably include oxide-based active materials having a layered structure and oxide-based active materials having a spinel-type structure which are used for positive electrodes of common lithium-ion batteries. Typical examples of such active materials include lithium transition metal oxides such as lithium-cobalt-based oxides, lithium-nickel-based oxides, and lithium-manganese-based oxides. Examples for the conductive material include carbon materials such as carbon black, e.g. acetylene black, graphite powder and conductive metal powder such as nickel powder. The same binder as those referred to for the negative electrode may be used.

The electrolyte used to mediate the positive and negative electrodes may preferably be a liquid electrolyte containing a non-aqueous solvent and a lithium salt (supporting electrolyte) soluble in the solvent, or a solid (gel) electrolyte which contains a polymer added to the above liquid electrolyte. The non-aqueous solvent to be used may be aprotic solvents such as carbonates, esters, ethers, nitriles, sulfones, lactones. The non-aqueous solvent to be used may be one or two or more selected from non-aqueous solvents generally known to be used as an electrolyte for common lithium-ion batteries such as ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethyl sulfoxide, sulfolane, γ-butyrolactone.

The supporting electrolyte to be used may be one or two or more selected from various lithium salts known to be functional as a supporting electrolyte in a liquid electrolyte for lithium-ion batteries such as $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$, $LiClO_4$. The concentration of the supporting electrolyte (supporting salt) is not specifically limited and may be, for example, the same as that of the electrolytes used for conventional lithium-ion batteries. Usually, the non-aqueous electrolyte used may preferably contain the supporting electrolyte at a concentration of approximately 0.1 mol/L to 5 mol/L, e.g. approximately 0.8 mol/L to 1.5 mol/L.

The lithium ion battery may be constituted with an appropriate container (metal or resin housing, laminated film bag, etc.) into which the above positive and negative electrodes are contained together with the electrolyte. According to a typical structure of the lithium-ion batteries disclosed herein, a separator is present between the positive and negative electrodes. The separator may be similar separators used for common lithium-ion batteries, without any limitation. The separator may be a porous sheet of resins such as polyethylenes (PE), polypropylenes (PP), polyesters, celluloses, polyamides, a non-woven fabric and the like. The lithium-ion batteries may contain a solid electrolyte which also acts as a separator. The shape of the lithium-ion batteries (outside shape of the container) is not specifically limited and may be, for example, cylindrical, rectangular, coin-shaped and the like.

Figure 10:
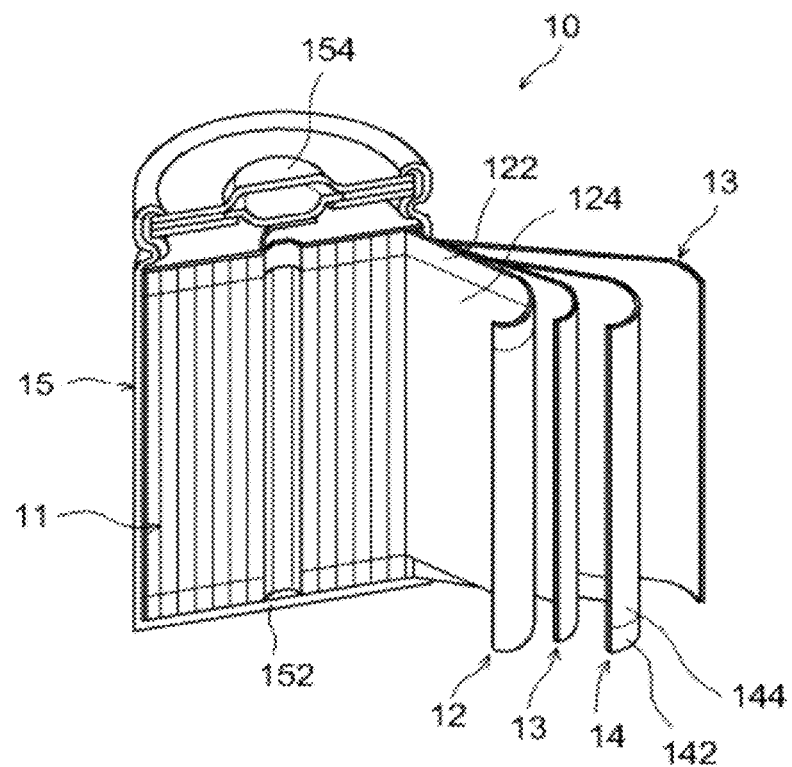
FIG. 10 is a vertical section view which represents an exemplary construction of the lithium-ion battery according to the present invention.

FIG. 10 shows a structural example of the lithium-ion batteries provided according to the present invention. According to the structure of the lithium-ion battery 10, an electrode unit 11 comprising a positive electrode 12 and a negative electrode 14 is contained together with a non-aqueous liquid electrolyte (not shown) in a battery case 15 having a shape that is capable of accommodating the electrode unit. The electrode unit 11 is formed by winding the positive electrode 12 and the negative electrode 14 together with two long-length sheet separators 13, wherein the positive electrode comprises a positive electrode mixture layer 124 on a long-length sheet positive current collector 122 and the negative electrode comprises an iron oxide membrane (active material layer) 144 having a given thickness on a rough surface of a long-length sheet negative electrode current collector (e.g. electrolytic copper foil) 142. The battery case 15 comprises a bottomed cylindrical case core 152 and a lid 154 for covering the opening. The lid 154 and the case core 152 are both made of metal and mutually insulated, and are respectively electrically connected with the positive and negative electrode current collectors 122 and 142. Thus, in this lithium-ion battery 10, the lid 154 and the case core 152 also act as the positive and negative electrode terminals, respectively.

The electric double layer capacitors disclosed herein have a structure in which a pair of (two) electrodes constituted as the above negative electrode of the lithium-ion batteries are contained together with an electrolyte and an optional separator in an appropriate container. The container and the separator to be used may be the same as those used for the lithium-ion batteries.

The electrolyte for the electric double layer capacitors to be used may preferably be a liquid electrolyte containing a non-aqueous solvent and a lithium salt (supporting electrolyte) soluble in the solvent. The non-aqueous solvent to be used may be the same as those for the lithium-ion batteries. The supporting electrolyte to be used may preferably be a salt of a quaternary ammonium cation combined with an anion. The cation composing such salt is preferably aliphatic quaternary ammonium cation such as tetraalkylammonium cation. The preferred tetraalkylammonium cation has, for example, four alkyl groups independently selected from alkyl groups having 1 to 10 carbon atoms, more preferably 1 to 4 carbon atoms, still more preferably 1 to 2 carbon atoms. Specific examples of such cation include tetramethylammonium ion, tetraethylammonium ion, tetrapropylammonium ion, ethyltrimethylammonium ion, triethylmethylammonium ion, diethyldimethylammonium ion and the like. The anion to be combined with such cation may preferably be selected from anions such as $BF_4^-$, $PF_6^-$, $ClO_4^-$, $(CF_3SO_2)_2N^-$, $(C_2F_5SO_2)_2N^-$, $CF_3SO_3^-$. One or two or more of compounds (salts) composed of the combination of such cations and anions can be used. The electrolyte preferably contains such compound in a concentration of, for example, 0.3 mol/L to 3 mol/L, more preferably 0.5 mol/L to 2 mol/L, still more preferably 0.7 mol/L to 1.5 mol/L. For example, a preferred electrolyte used has composition such that an aliphatic quaternary ammonium salt such as tetraethylammonium tetrafluoroborate ($TEABF_4$), triethylmethylammonium tetrafluoroborate ($TEMABF_4$) is dissolved in propylene carbonate (PC).

Several examples relating to the present invention are described hereinafter, which are not intended to limit the present invention thereto.

EXAMPLE 1

To a 10.8-mL volume supercritical water reactor (Taiatsu Techno Corp.) composed of nickel alloy (trade name: Hastelloy C-22) were added 1.30 g of n-hexane (15.1 mmol) as a starting material (carbon source), 2.00 g of a 31% $H_2O_2$ aqueous solution (containing 18.2 mmol $H_2O_2$; this amount corresponds to about $1/12$ of the moles $M_P$ which were required to completely oxidative-decompose the above amount of n-hexane) and 3 g of distilled water. The content of the reactor was heated and pressurized, and maintained for 3 hours under the conditions of a temperature of 400° C. and a pressure of 71 MPa (supercritical conditions of water). The reactor was returned to room temperature and atmospheric pressure prior to opening the same, and the produced carbon particles A1 (crude carbon particles) were recovered and dried under vacuum. The mean particle diameter of the carbon particles A1 was 0.96 μm.

The carbon particles A1 was analyzed on a Raman spectrometer (Raman image microscope system 1000; Renishaw) to obtain Raman spectra and the ratio between D and G peaks ($I_D/I_G$) was calculated therefrom. As a result, the $I_D/I_G$ value of the carbon particles A1 was 0.79.

Figure 1D:
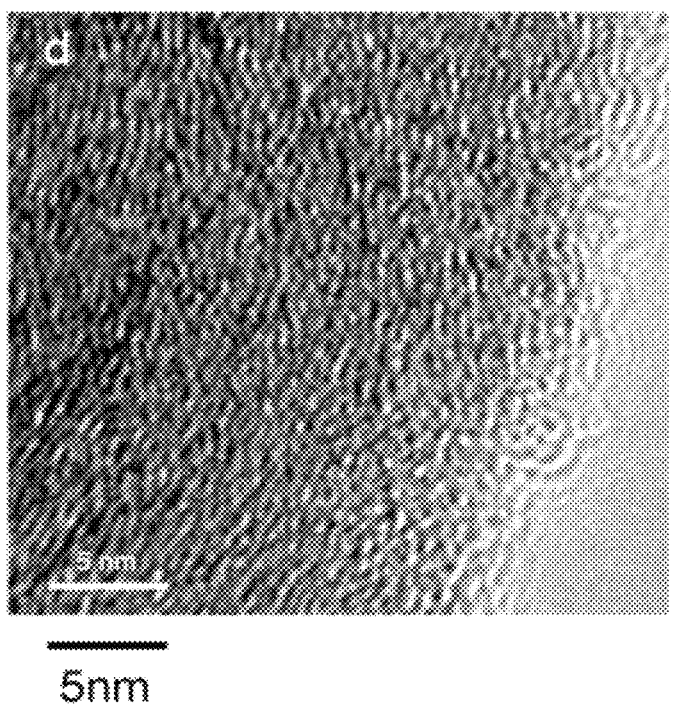
FIG. 1D is the high-power TEM image of carbon particles A1 obtained in Example 1.

FIGS. 1A to 1D show the images obtained by analyzing the carbon particles A1 under a scanning electron microscope (JEOL Ltd., type: JSM-7000F/IV) and a transmission electron microscope (JEOL Ltd., type: JEM2100F). FIGS. 1A to 1D respectively show the low-power scanning electron microscope (SEM) image, the high-power SEM image, the low-power transmission electron microscope (TEM) image and the high-power TEM image. These figures show that the degree of growth of graphene in the carbon particles A1 is relatively low. This is in conformity with the high $I_D/I_G$ value (0.79) as measured above. Although it was not obvious due to the small size of graphene, a slight concentrical orientation was recognized under TEM examination (FIG. 1D).

The carbon particles A1 obtained as above were maintained for 30 minutes in an Ar gas atmosphere at atmospheric pressure and at a temperature of 800° C. or higher and lower than 1500° C. (approximately 1000° C. was selected in this example) to perform heat treatment. Accordingly, a carbon material was obtained which was substantially composed of the heat-treated carbon particles (carbon particles B1). When the carbon particles B1 were examined under a TEM, no significant change in the appearance of the particles (shape and size of the particles) was recognized compared to the particles prior to the heat treatment (carbon particles A1).

Figure 2A:
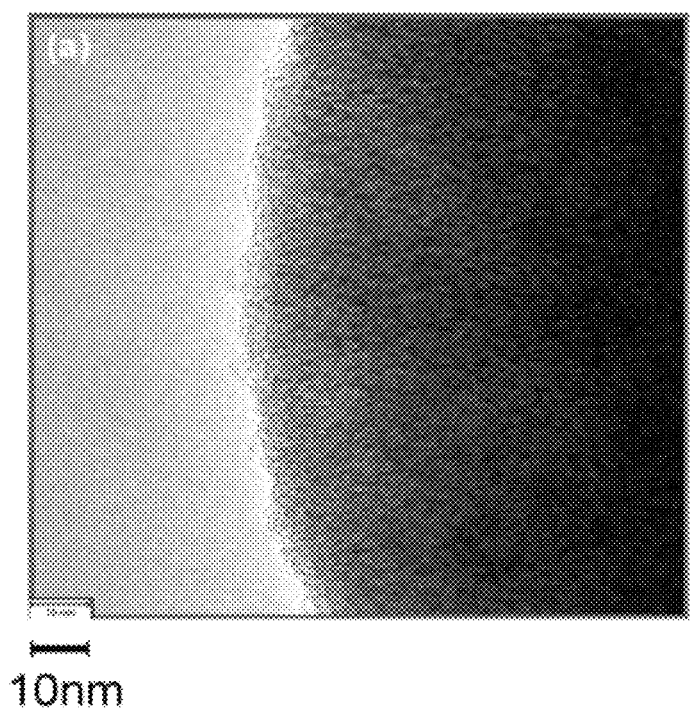
FIG. 2A is the low-power TEM image of carbon particles B1 obtained in Example 1.
Figure 2B:
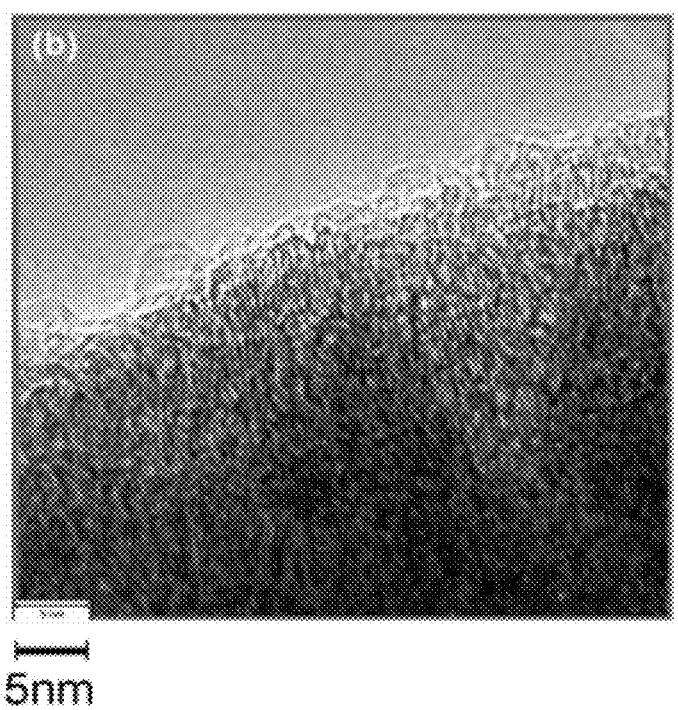
FIG. 2B is the high-power TEM image of carbon particles B1 obtained in Example 1.
Figure 3A:
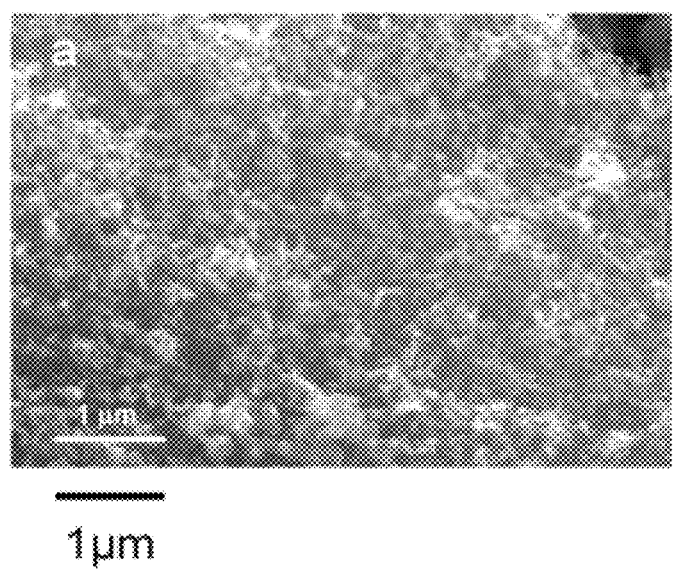
FIG. 3A is the low-power SEM image of carbon particles A2 obtained in Example 2.
Figure 3B:
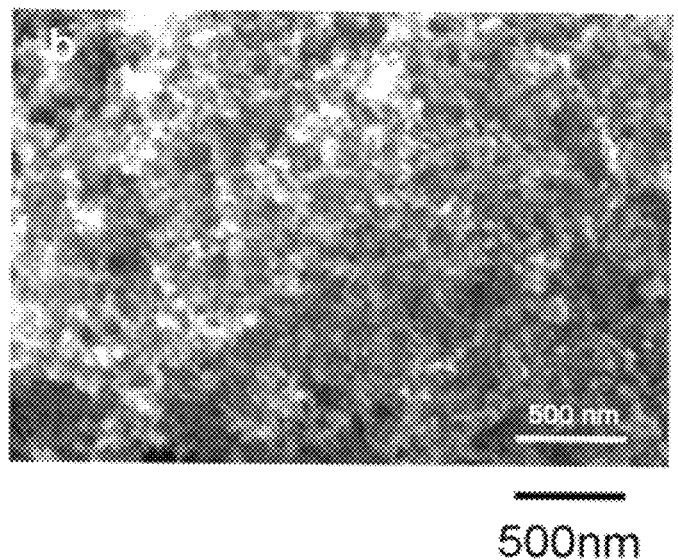
FIG. 3B is the high-power SEM image of carbon particles A2 obtained in Example 2.
Figure 3C:
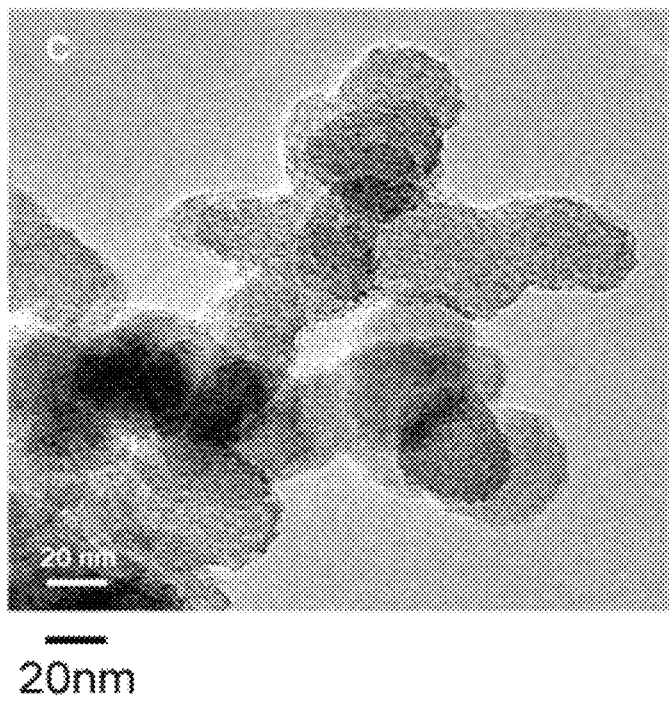
FIG. 3C is the low-power TEM image of carbon particles A2 obtained in Example 2.
Figure 3D:
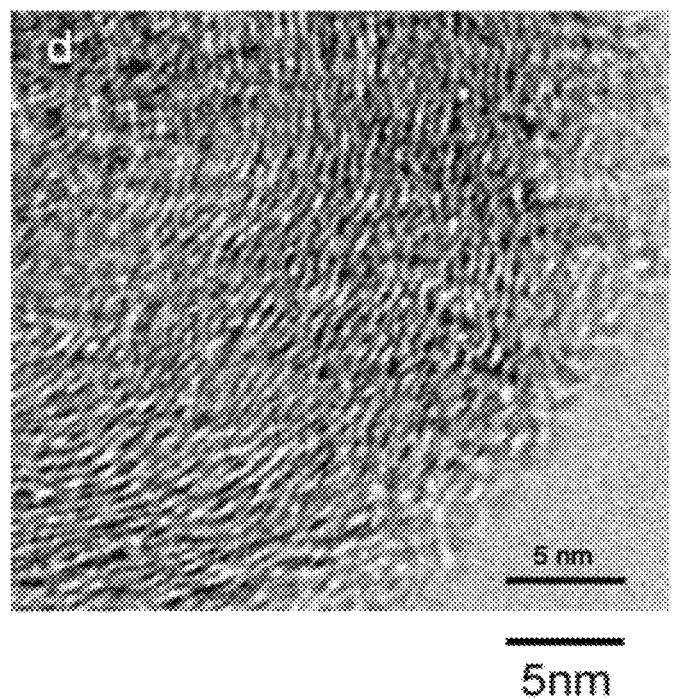
FIG. 3D is the high-power TEM image of carbon particles A2 obtained in Example 2.
Figure 4A:
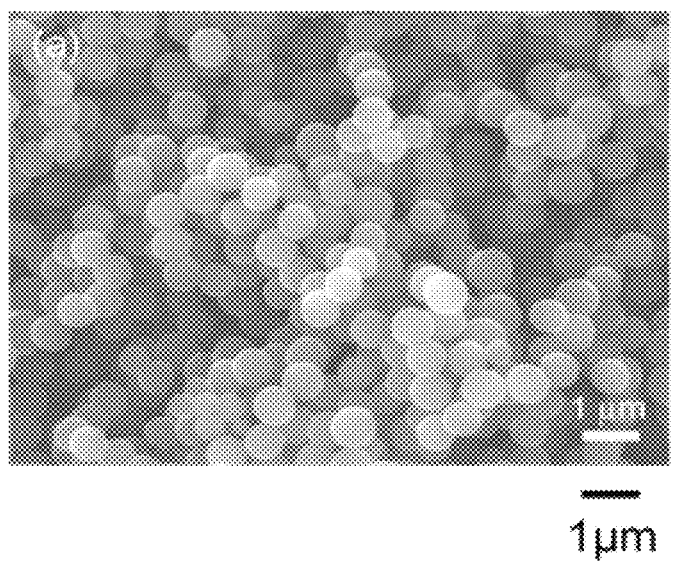
FIG. 4A is the low-power SEM image of carbon particles A3 obtained in Example 3.
Figure 4B:
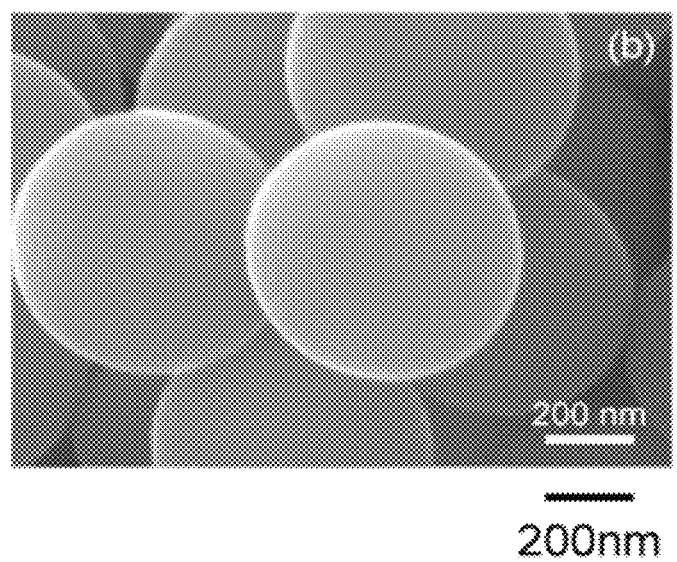
FIG. 4B is the high-power SEM image of carbon particles A3 obtained in Example 3.
Figure 5A:
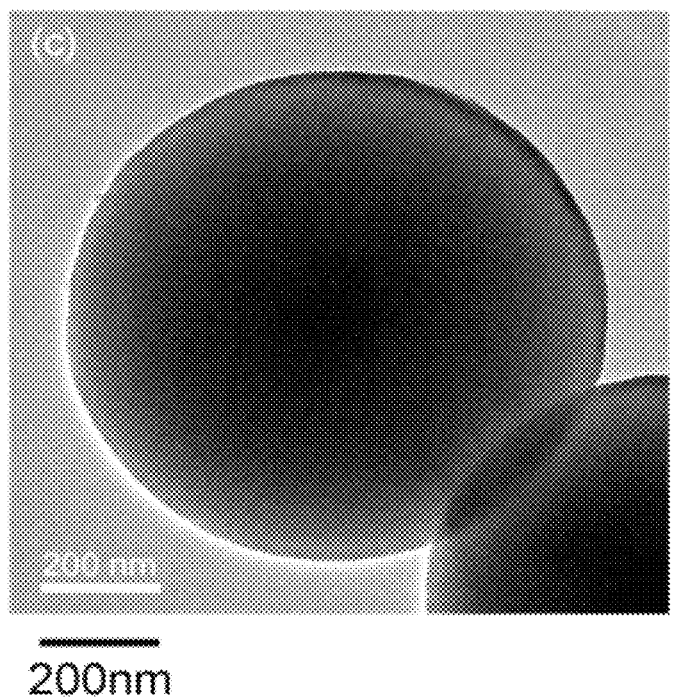
FIG. 5A is the low-power TEM image of carbon particles A3 obtained in Example 3.
Figure 5B:
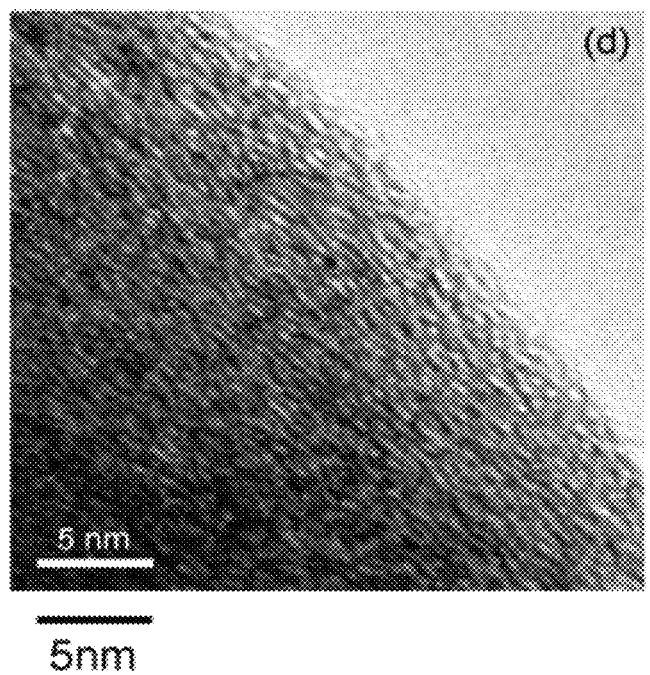
FIG. 5B is the high-power TEM image of carbon particles A3 obtained in Example 3.

FIGS. 2A and 2B respectively show low-power and high-power TEM images of the carbon particles B1. It is found from these TEM images that most of graphene in the carbon particles B1, different from the carbon particles A1, are radially oriented. The $I_D/I_G$ value of the carbon particles B1 as calculated from Raman spectrum was 1.05, which was more than 0.2 higher than the $I_D/I_G$ value of the carbon particles A1 prior to the heat treatment (0.79). This increase in the $I_D/I_G$ value may be attributed to an increase in graphene structure deficits (edge parts) due to multicrystallization of graphene. Multicrystallization of the carbon particles B1 was also confirmed by the half band width of the X-ray diffraction peak of graphene. Namely, the half band width of the carbon particles A1 was 9.669, while that of the carbon particles B1 was 9.782, which was broader than the carbon particles A1. Such multicrystallization effectively proceeds especially by the heat treatment at 1000° C. to 1500° C. which induces the radial orientation of graphene. Accordingly, it is presumed that the conversion to the radial orientation of graphene is accompanied by multicrystallization.

The carbon particles B1, which have been obtained by the above heat treatment between 800° C. or higher and lower than 1500° C. (e.g. approximately 1000° C.), can be further heat-treated at 1500° C. or higher (e.g. 1500° C. to 2800° C.) to increase a degree of growth of graphene according to the treatment temperature. Namely, it was found that the carbon particles obtained by heat-treating the carbon particles B1 ($I_D/I_G$ value=1.05) for 30 minutes at 1500° C., 1900° C., 2200° C., 2500° C. or 2800° C. had the $I_D/I_G$ values of 0.98, 0.79, 0.63, 0.34 or 0.27, respectively, as obtained from their Raman spectra, indicating that the $I_D/I_G$ value decreased when the treatment temperature increases. These results support that a degree of growth of graphene can be increased by the heat treatment at higher temperature range than the temperature range which induces the radial orientation of graphene (800° C. or higher and lower than 1500° C., particularly 1000° C. or higher and lower than 1500° C.).

EXAMPLE 2

To the same reactor as Example 1 were added 1.30 g of n-hexane, 2.00 g of a 31% $H_2O_2$ aqueous solution and 3 g of distilled water. The content of the reactor was maintained for 3 hours under the conditions of a temperature of 500° C. and a pressure of 111 MPa (supercritical conditions of water). The reactor was returned to room temperature and atmospheric pressure prior to opening the same, and the produced carbon particles A2 (crude carbon particles) were recovered and dried under vacuum. The mean particle diameter of the carbon particles A2 was 0.59 μm.

FIGS. 3A to 3D respectively show the low-power SEM image, the high-power SEM image, the low-power TEM image and the high-power TEM image of the carbon particles A2. It is recognized that the carbon particles A2 obviously have a higher degree of growth of graphene of the carbon particles A1. It is also found that the carbon particles A2 have the concentrical orientation. The $I_D/I_G$ value of the carbon particles A2 was 0.64 as calculated from Raman spectra. These results confirm that the degree of growth of graphene of the carbon particles A2 is higher than that of the carbon particles A1. Accordingly, it was confirmed that the carbon particles having higher graphitization degree (degree of growth of graphene) can be produced by increasing the temperature and pressure in the supercritical treatment.

EXAMPLE 3

To the same reactor as Example 1 were added 1.17 g of benzene (15.0 mmol), 2.00 g of a 31% $H_2O_2$ aqueous solution (containing the amount of $H_2O_2$ corresponding to about ⅕ of the moles $M_P$ which were required to completely oxidative-decompose the above amount of benzene) and 3 g of distilled water. The content of the reactor was maintained for 3 hours under the conditions of a temperature of 400° C. and a pressure of 48 MPa (supercritical conditions of water). The reactor was returned to room temperature and atmospheric pressure prior to opening the same, and the produced carbon particles A3 (crude carbon particles) were recovered and dried under vacuum. Thus, a carbon material was obtained which was substantially composed of the carbon particles A3. FIGS. 4A and 4B and 5A and 5B respectively show low-power and high-power SEM images, and low-power and high-power TEM images of the carbon particles A3. The mean particle diameter of the carbon particles A3 was 720 μm. By comparing FIGS. 5B, 1D and 3D, it is found that the degree of growth of graphene of the carbon particle A3 is lower than that of the carbon particles A1 and A2. The $I_D/I_G$ value of the carbon particles A3 was 0.88 as calculated from Raman spectra, which was higher than that of the carbon particles A1 (0.79) and A2 (0.64). This higher $I_D/I_G$ value of the carbon particles A3 was in conformity with the low degree of growth of graphene analyzed by the TEM images.

<Performance Evaluation of Capacitors>

The carbon material prepared in Example 1 (which was substantially composed of the carbon particles B1 in which the orientation of graphene was radially controlled) was mixed with a binder, polytetrafluoroethylene (PTFE) in a mass ratio of 95:5. The mixture (40 mg) was compression-moulded for 3 minutes at a pressure of 9.8 kN to prepare two pellet electrodes having a diameter of 13 mm and a thickness of 250 μm. The two electrodes were arranged to face each other with a porous separator (Nippon Kodoshi Corp.) being placed therebetween, and glassy carbon current collectors were placed on the outside of the respective electrodes. These components were assembled in a stainless steel container with a liquid electrolyte and left under a pressure of 20 kPa overnight to allow the impregnation with the liquid electrolyte. The liquid electrolyte used was tetraethylammonium tetrafluoroborate (TEABF$_4$) dissolved in propylene carbonate at a concentration of 1.0 mol/L. Accordingly, the carbon material of Example 1 was used as an active material to prepare a capacitor cell C1.

A capacitor cell C2 containing the carbon material according to Example 3 (which was substantially composed of the carbon particles A3 in which the orientation of graphene was concentrically controlled) as an active material was prepared in a similar manner as the preparation of the capacitor cell C1 except that the carbon material prepared in Example 3 was used instead of the carbon material B1.

Figure 6:
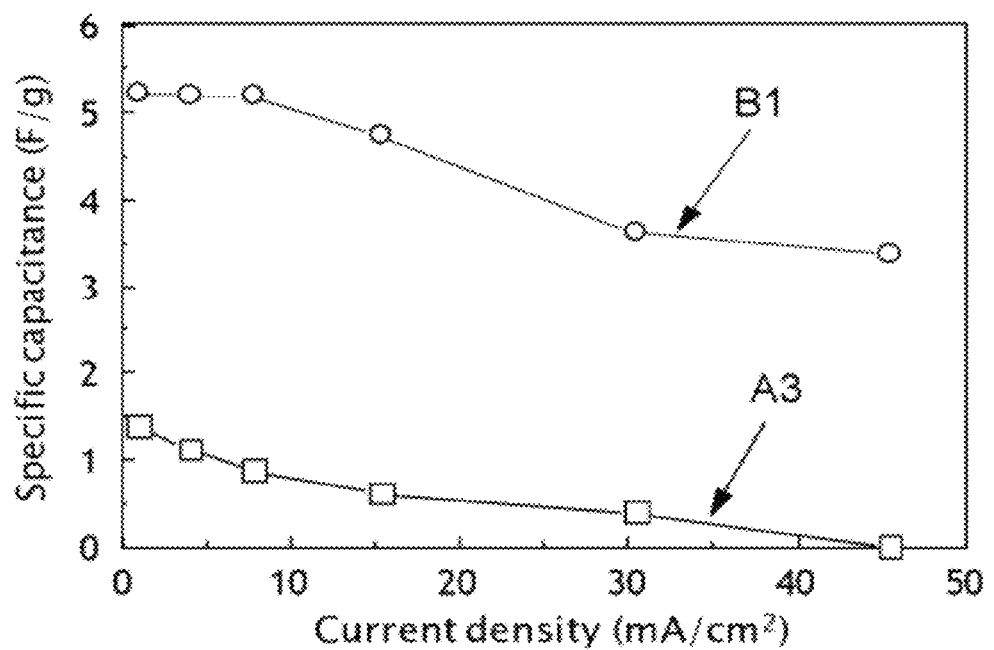
FIG. 6 is a graph representing the capacitance per mass of capacitor cells obtained by using the carbon materials according to Examples 1 and 3, respectively, as an active material.
Figure 7:
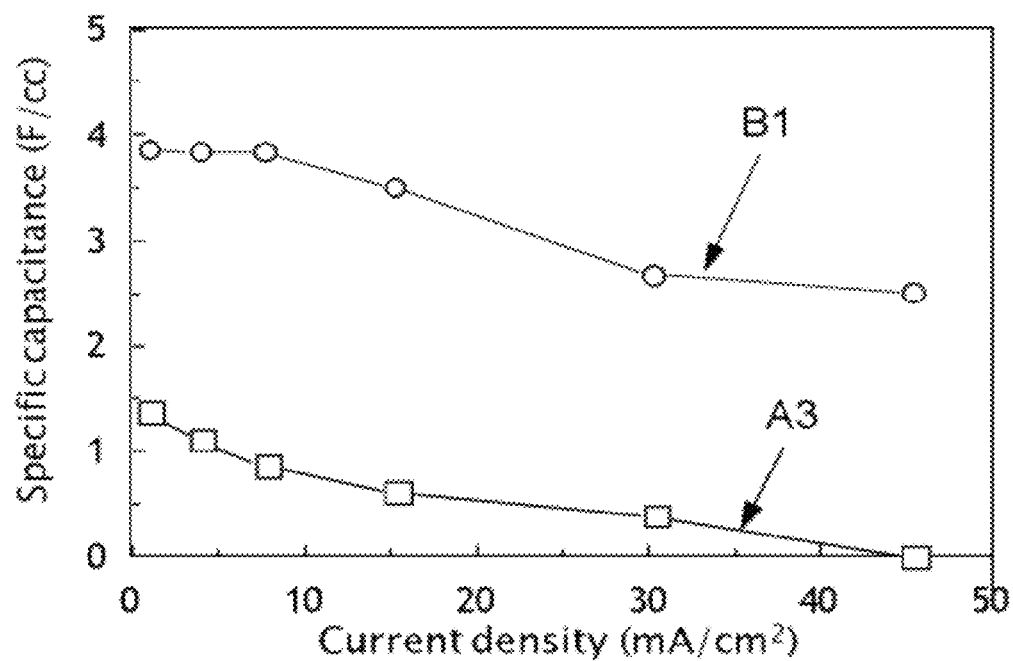
FIG. 7 is a graph representing the capacitance per volume of capacitor cells obtained by using the carbon materials according to Examples 1 and 3, respectively, as an active material.

Capacitance characteristics of the capacitor cells C1 and C2 were evaluated as follows. Thus, the capacitor cells C1 and C2 were charged by applying a voltage of 2.5 V using a commercially available charge/discharge tester in a glovebox maintained at 25° C., and then they were discharged at a constant current of 1 mA/cm$^2$ to 45 mA/cm$^2$ to calculate the capacitance. The results are shown in FIGS. 6 and 7. The vertical axis of FIG. 6 shows the capacitance per mass of the active material used and that of FIG. 7 shows the capacitance per volume of the active material used. As shown in the figures, it was found that the carbon particles B1 having the radial surface structure have approximately 4-fold higher capacitance than the carbon particles A3. Because the degree of crystallinity of graphene of the carbon particles B1 having the radial orientation ($I_D/I_G$ value=1.05) is lower than that of the carbon particles A3 having the concentrical orientation ($I_D/I_G$ value=0.88), it is estimated that the high capacitance of the carbon particles B1 as shown above is attributed to the direction (orientation) of graphene. The carbon particles used in this example have not been subjected to an activation treatment (treatment to form pores on graphene); it is expected that the capacitance characteristics of the radially oriented particles on which surface the edges of graphene predominantly present can further be improved by controlling the surface structure (orientation of graphene) of the carbon particles or by activating the carbon particles.

EXAMPLE 4

To the same reactor as Example 1 were added 1.28 g of gas oil, 2.00 g of a 31% $H_2O_2$ aqueous solution and 3 g of distilled water. The content of the reactor was maintained for 3 hours under the conditions of a temperature of 400° C. and a pressure of 71 MPa (supercritical conditions of water). The reactor was returned to room temperature and atmospheric pressure prior to opening the same, and the produced carbon particles A4 were recovered and dried under vacuum. The mean particle diameter of the carbon particles A4 was 0.90 μm and the $I_D/I_G$ value was 0.85. The carbon particles A4 were found to have a slight concentrical orientation under TEM examination.

EXAMPLE 5

To the same reactor as Example 1 were added 1.30 g of n-hexane, 2.00 g of a 31% $H_2O_2$ aqueous solution and 3 g of distilled water. The content of the reactor was maintained for 3 hours under the conditions of a temperature of 330° C. and a pressure of 48 MPa (subcritical conditions of water). The reactor was returned to room temperature and atmospheric pressure prior to opening the same, and the produced carbon particles A5 were recovered and dried under vacuum. The mean particle diameter of the carbon particles A5 was 0.38 μm and the $I_D/I_G$ value was 0.84. The carbon particles A5 were found to have a slight concentrical orientation under TEM examination.

The present invention has been illustrated in detail as above. It should be recognized that these aspects are merely illustrative and the present invention disclosed herein include various modifications and alterations of the above specific examples.

The invention claimed is:

1. A method of producing a carbon material comprising 50% by mass or more graphene-containing carbon particles, the method comprising:
   producing carbon particles from an organic substance by maintaining a mixture containing the organic substance as a starting material, hydrogen peroxide and water under conditions of a temperature of 300° C. to 1000° C. and a pressure of 22 MPa or more; and
   heat-treating the carbon particles, wherein
   the heat treatment is carried out at a temperature higher than the temperature maintained in the carbon particle producing step and lower than 1500° C., and
   a ratio ($I_D/I_G$) of the D peak intensity ($I_D$) and the G peak intensity of ($I_G$) in Raman spectra of the carbon particles is increased in the heat-treating step.

2. The method according to claim 1, wherein the organic substance is a hydrocarbon.

3. The method according to claim 1, wherein the heat treatment is carried out at a temperature of 800° C. or higher and lower than 1500° C.

4. The method according to claim 1, wherein in the carbon particle producing step, the carbon particles are produced such that the ratio ($I_D/I_G$) of the D peak intensity ($I_D$) and the G peak intensity ($I_G$) in Raman spectra is 0.6 or more.

5. The method according to claim 4, wherein in the carbon particle producing step, the mixture is maintained under conditions of a temperature of 300° C. to 600° C. and a pressure of 22 MPa to 100 MPa.

6. A method according to claim 1, wherein the ratio ($I_D/I_G$) of the carbon particles is increased by 0.2 or more in the heat-treating step.

7. A method according to claim 1, wherein the heat treatment is carried out at 1000° C.±50° C.

8. The method according to claim 1, further comprising further heat-treating the carbon particles obtained by the heat-treating step, wherein the further heat-treating step is carried out at 1500° C. or higher.

9. A method according to claim 1, wherein the carbon particles have a mean particle diameter of 0.02 μm to 0.7 μm.

* * * * *